(12) United States Patent
Schumacher et al.

(10) Patent No.: US 8,395,868 B2
(45) Date of Patent: Mar. 12, 2013

(54) SHORT CIRCUIT LIMITATION DEVICE IN A LOW VOLTAGE SYSTEM

(75) Inventors: Andreas Schumacher, Dattenberg (DE); Peter Terhoeven, Alfter (DE)

(73) Assignee: Eaton Industries GmbH, Bonn (DE)

( * ) Notice: Subject to any disclaimer, the term of this patent is extended or adjusted under 35 U.S.C. 154(b) by 205 days.

(21) Appl. No.: 12/271,641

(22) Filed: Nov. 14, 2008

(65) Prior Publication Data

US 2010/0123986 A1 May 20, 2010

(51) Int. Cl.
*H02H 3/00* (2006.01)
(52) U.S. Cl. ......................................................... 361/54
(58) Field of Classification Search .................. 361/54, 361/55, 57, 67, 62
See application file for complete search history.

(56) References Cited

U.S. PATENT DOCUMENTS

| | | | | | |
|---|---|---|---|---|---|
| 2,929,012 | A | * | 3/1960 | Bohm | 363/52 |
| 2,932,708 | A | * | 4/1960 | Jensen | 337/15 |
| 3,805,113 | A | * | 4/1974 | Friedrich | 361/67 |
| 4,130,850 | A | * | 12/1978 | Cronin et al. | 361/54 |
| 2004/0027791 | A1 | * | 2/2004 | Marmonier et al. | 361/602 |
| 2008/0007881 | A1 | * | 1/2008 | Boeder et al. | 361/54 |

FOREIGN PATENT DOCUMENTS

| | | |
|---|---|---|
| DE | 4404074 | 8/1995 |
| DE | 4438593 | 5/1996 |
| DE | 19716826 A1 | 11/1998 |
| DE | 29823849 U1 | 4/2000 |
| DE | 10349552 | 6/2005 |
| EP | 0982828 A2 | 3/2000 |
| EP | 1052665 | 11/2000 |
| GB | 1121078 A | 7/1968 |
| WO | 0062320 | 10/2000 |
| WO | 01/33685 A1 | 5/2001 |
| WO | 02/15361 A1 | 2/2002 |

OTHER PUBLICATIONS

David H. Smith et al. "Problems Involving Industrial Plant-Utility Power System Interties", IEEE Transaction on Industry Applications, vol. IA-11, No. 6, Nov. 1975, pp. 636-640.
European Patent Office, International Search Report in International Patent Application No. PCT/EP2008/009154 (Apr. 24, 2009).

* cited by examiner

*Primary Examiner* — Ronald W Leja
(74) *Attorney, Agent, or Firm* — Leydig, Voit & Mayer, Ltd.

(57) ABSTRACT

A device for limiting short-circuit current in a consumer network having at least one supply line with a respective current feed point includes a disconnection point disposed in the at least one supply line so as to provide a first partial line and a second partial line in an event of a short-circuit fault. Each of the first and second partial lines has a respective associated current detector and at least one of the first and second partial lines has at least one current feed aggregate. The device includes a multiphase high-speed short circuiter having a current carrying capacity for short-circuit current intensities in the at least one supply line and a respective power circuit breaker connected in series with the high-speed short circuiter. The respective associated current detector is configured, upon detection of a short circuit in one of the first and second partial lines, to transmit a triggering signal so as to effect a short-circuit switching operation.

15 Claims, 2 Drawing Sheets

SHORT CIRCUIT LIMITATION DEVICE IN A LOW VOLTAGE SYSTEM

FIELD

The present invention relates to a limiting device for short circuits in a consumer network operated with alternating current and low voltage and having one or more supply lines configured as cables or conductor bars having current feed points where current feed aggregates protected by incoming switches are arranged.

BACKGROUND

A safe energy supply calls for the protection of the energy feed as well as of the energy distribution. These requirements are preferably made of a cable system. Small-scale networks can also make use of a conductor bar distribution system.

Consequently, power circuit breakers and an associated triggering system are set in such a manner that, whenever necessary, for purposes of interrupting fault currents, only the power circuit breaker that is located directly upstream from the fault site is triggered. This selectivity limits to a minimum the area (the faulty electric circuit) that has to be interrupted in a fault scenario. All of the other components of the installation remain in operation. Here, the triggering times of series-connected protection devices have to be carefully coordinated with each other and the switching devices as well as the distribution systems (cable or bars) have to be capable of conducting the short-circuit current for the entire time during which the switching device is switched off, plus the delay time that is needed for the selectivity. One speaks of a selective staggering of the protection devices in this context.

Protection and selectivity requirements, especially in stand-alone installations, can be stipulated in local or regional classification or building regulations, which should be observed in each individual case.

Thus, for instance, it can be stipulated for a consumer network that, in installations that require a main current source to maintain a specific priority consumer, it is preferable that it be possible to divide a main supply line into at least two sections that are normally connected via switches or other approved means. To the extent possible, the connections of the generators and of the consumers coupled thereto should be uniformly distributed over sections of the main supply line. Similar regulations or requirements exist in the case of large industrial consumers, whereby, as a rule, they have drawn up their own regulations.

Groups of consumers, some of them also having generators configured as diesel aggregates, are connected to a supply line (e.g. main cable line or busbar). For purposes of electrically disconnecting at least two such groups so as to uncouple them from each other in a fault scenario, a disconnection point is created with a coupling switch. After the coupling switch opens (in a fault scenario), both partial sections of a supply line are electrically independent of each other.

The rated currents in supply lines in a consumer network that is relevant for the invention can reach values of more than 8000 A, which is the case, for example, because of the high energy demand at a voltage level of up to 690 V AC. This high energy density causes low-voltage switching devices to operate at the limit of their capacity; in particular, mention should be made here of the short-circuit switch-off capacity. The coupling switch has to be capable of reliably interrupting short-circuit currents of more than 100 kA. Conventional power circuit breakers are overtaxed by such requirements, so that there is a need to find alternatives for limiting short-circuit currents.

The extremely high current intensities that occur during short circuits have been mentioned. This means that the current-carrying elements (cables and/or conductor bars) have to be dimensioned for such intensities. Therefore, these elements need to have lines with commensurately large cross sections. As a consequence, investment costs for lines with large cross sections are high, especially in view of the rising market prices for copper.

Protection systems against short circuits for low-voltage installations have already been proposed and there has even been speculation about a complex system with supraconductive disconnector switches (German patent application DE 10349552 A1).

The above-mentioned considerations apply equally to the energy supply of consumer networks that are relevant for the present invention such as, for example, residential neighborhoods, automotive assembly lines or large industrial consumers. The energy distribution there can have the topology of a ring (full ring or partial ring); the feed into the supply lines takes place at the medium voltage level via transformers. Other topologies are likewise possible.

Examples of high-speed short circuiters are the following: short circuiters as short-circuit switches that switch via thyristors (German patent application DE 4438593 A1) or switches of the vacuum interrupter type (German patent application DE 4404074 A1). Some types of high-speed short circuiters are multiple short circuiters while others, in turn, can only be actuated one single time (one-time short circuiter).

European patent application EP 1052 665 B1 and international patent application WO 2000 62320 A1 describe high-speed short circuiters of the type of a pyrotechnically operated high-speed short circuiter. This high-speed short circuiter can trigger a short circuit within an actuating time of less than 3 ms. The pyrotechnical drive drives a metal bolt through the stack of connecting bars so that the phases are electrically and mechanically contacted with each other within the actuating time. Pyrotechnically driven high-speed short circuiters are one-time short circuiters that have to be replaced after every switching procedure. In a low-voltage installation, the removal of an actuated one-time short circuiter and the installation of a new one-time short circuiter can be carried out by a person who has received electrotechnical training.

SUMMARY

Therefore, it is an aspect of the present invention to provide a protection system for the energy supply on the low-voltage level that can cope with an elevated energy demand.

In an embodiment, the present invention provides a device for limiting short-circuit current in a consumer network having at least one supply line with a respective current feed point and operated with alternating current and low voltage, where electric energy having a medium voltage level is supplied to the customer network via current feed aggregates. The device includes a disconnection point disposed in the at least one supply line so as to provide a first partial line and a second partial line in an event of a short-circuit fault, each of the first and second partial lines having a respective associated current detector and at least one of the first and second partial lines having at least one current feed aggregate. The device includes a multiphase high-speed short circuiter disposed in the disconnection point and having a current carrying capacity for short-circuit current intensities in the at least one supply line and a respective power circuit breaker connected in series with the high-speed short circuiter toward each of the first and second partial lines, a switch-off time of the respective power circuit breaker being shorter than a switch-off time of an associated incoming switch. The respective associated current detector is configured, upon detection of a short circuit in one of the first and second partial lines, to transmit a triggering signal to the high-speed short circuiter so as to effect a short-circuit switching operation in the disconnection point.

BRIEF DESCRIPTION OF THE DRAWINGS

The present invention will be presented in greater depth in the figures, which show the following in detail.

DETAILED DESCRIPTION

Figure 1:
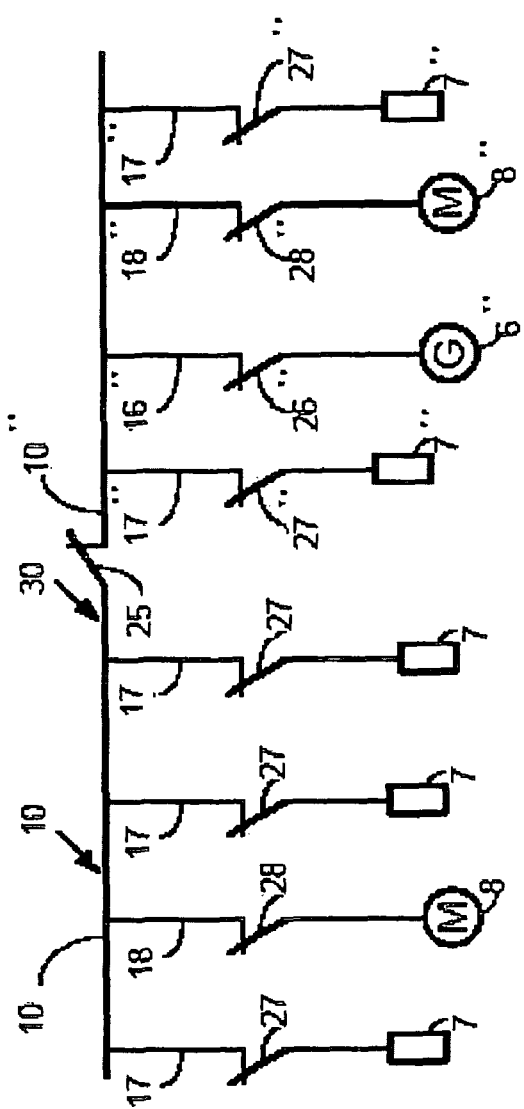
FIG. 1 shows a schematic diagram of a low-voltage switch installation with a coupling switch in a disconnection point (as the state of the art)

A protection system according to an embodiment of the present invention for the consumer network is suitable, for example, to feed medium voltage as the energy supply for built-up areas (residential neighborhoods) or for large industrial consumers. Another possible area of utilization is for stand-alone installations, examples of which include electrical systems on ships or offshore platform systems (oil rigs). The term consumer network will be employed generally below.

In an embodiment, the present invention includes a multiphase high-speed short circuiter (a three-phase short circuiter in the case of alternating current) with sufficient current-carrying capacity for the short-circuit current intensities that are expected to occur in the supply lines is installed in the disconnection point. A power circuit breaker is series-connected to the high-speed short circuiter towards each partial line, whereby the switch-off time of the power circuit breakers is superordinated relative to the incoming switches. A current detector is associated with each partial line and, when a short circuit occurs in one of the partial lines, the current detector that detects the short circuit transmits a triggering signal to the high-speed short circuiter(s) which, in response, effectuate(s) a short-circuit switching operation in the disconnection point.

The detection and triggering of the short-circuit switching operation of the short circuiter opens at least one of the two power circuit breakers in the disconnection point. In the faulty partial line, the protection switching devices that are present—the incoming switches associated with the current feed aggregates—"experience" the short-circuit current and disconnect the current path of the current feed aggregates. The opening of the power circuit breakers located in the disconnection point causes both partial lines to be electrically independent of each other. The energy supply is maintained in the non-faulty partial line, since the partial section there is isolated from the short circuit.

The parallel short circuit caused by the short circuiter reduces the effective value of the short-circuit current since the short-circuit current is distributed over two existing "fault locations". The strength of the effect of the short circuit is attenuated and limited to the affected zone in the distribution system.

Another advantage of the present invention is that the provided priority (selectivity) between the incoming switches and the power circuit breakers in the disconnection point causes the short-circuit switch-off capacity of the incoming switch to be reduced. In other words, incoming switches having a lower performance range can be utilized.

The high-speed short circuiter can be inserted into a coupling bar that bridges the disconnection point. This means that the disconnection point is physically longer than the distance between the connection conductor bars of the high-speed short circuiter. Therefore, the ends of the partial lines can be bridged with the coupling bar.

The high-speed short circuiter should have sufficient current-carrying capacity for any current intensity of a short circuit that can be expected to occur. Otherwise, it is preferable to employ additional high-speed short circuiters as individual devices having a lower current-carrying capacity, which are each connected in parallel and energized. Two or more short circuiters as individual devices having a lower current-carrying capacity would then execute the switching procedure quickly and reliably.

Preferably, a high-speed short circuiter of the type of a pyrotechnically operated high-speed short circuiter is used.

The detection threshold of the current detectors should be adjustable, whereby the detection threshold can be set at two times or foul times the rated current. A current transformer is proposed as the current detector.

The supply lines of the low-voltage installation can be configured as cables and/or as conductor bars.

As already mentioned, the low-voltage supply system can be a consumer network configured as a stand-alone system. The supply lines of the supply system can have a linear or ring-shaped topology.

It should be possible to electronically actuate and lock the power circuit breaker that is tripped in the disconnection point in case of a short circuit, so that it cannot be switched back on as long as the actuated high-speed short circuiter (which perhaps cannot be actuated again) is still installed. This provides protection against (unintentionally) switching the power circuit breaker on once again while the short circuit is present.

The voltage level of the low-voltage installation in which the arrangement according to the invention is to be used can be, for instance, 400 V or 690 V.

FIG. 1 schematically shows a low-voltage switching installation with a coupling switch in a disconnection point, for instance, a low-voltage installation in a residential neighborhood.

The figure shows a supply line 10 to which consumers 7 and motor drives 8 are connected. Transformers and diesel-driven generators can be used as the current feed aggregates. Both types of current feed aggregates are designated in the figures by the reference letter G. The supply line supplies the electric energy that is fed in at the consumers and motor drives. In order to electrically disconnect at least two such groups so as to operate them independently or to uncouple them from each other in a fault scenario, a coupling switch 25 is placed in the supply line 10, thus creating a disconnection point 30. The disconnection point 30 can be placed in such a way that the various consumers and motor drives are symmetrical relative to the disconnection point. After the coupling switch 25 has opened, the two partial supply lines 10', 10" are electrically independent of each other. The coupling switch 25 has to have a particularly high short-circuit switch-off capacity in order to be effective in a fault scenario.

Rising requirements in terms of the electric performance in a supply system 10 can "overtax" the capacity of the coupling switch 25. A special coupling switch, however, is not employed in the arrangement according to the invention, since the invention is intended to put forward an improvement in the protection system. Instead of special coupling switches, two conventional circuit breakers 32', 32" are used.

Figure 2:
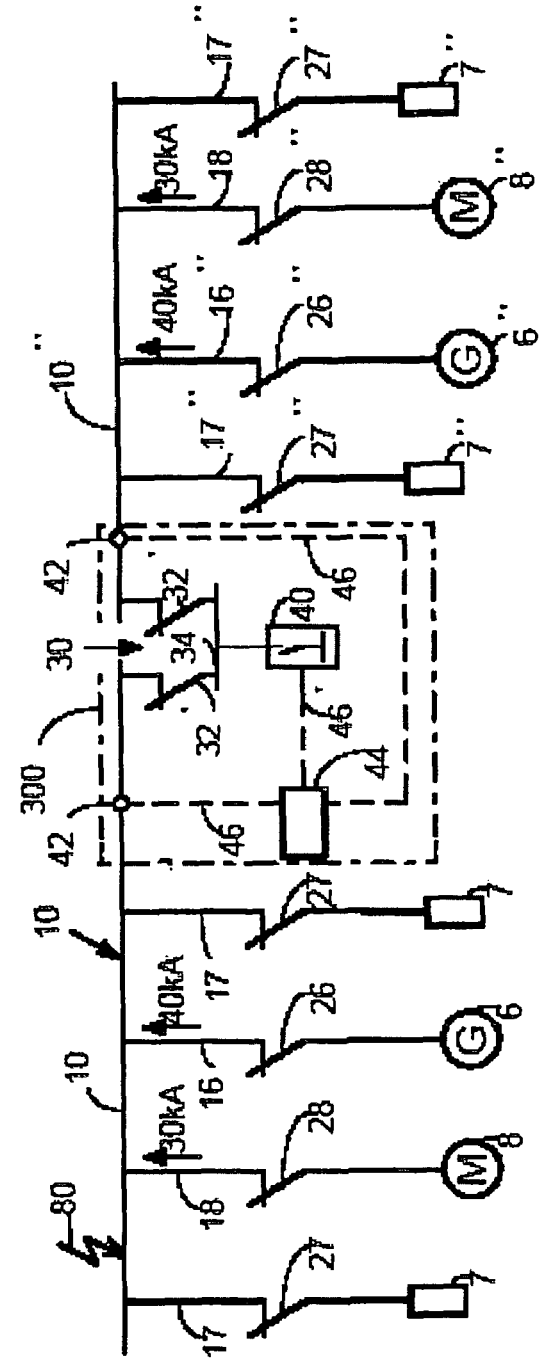
FIG. 2 shows a switching installation with a device for limiting and interrupting short-circuit currents.

Like FIG. 1, the depiction in FIG. 2 shows electrical aggregates (generators 6, motor drives 8, consumers 7) connected to the supply lines 10', 10" via appropriate current paths 16, 17, 18 and protected by means of power circuit breakers 26, 27, 28. The reference numerals of the aggregates of the busbar section 10" are provided with double primes.

The high-speed short circuiter 40 that lies in the current path 34 is protected on both sides relative to the two busbar sections 10', 10" by means of conventional power circuit breakers 32', 32". The current flowing through the supply line (busbar 10, or through its partial sections 10', 10") is monitored by current sensors 42 (for example, magnetic converters or Hall sensors). The detection threshold of the current sensors is adjustable and should be set at a value that is a multiple of the rated current. The arrangement of high-speed short circuiters with series-connected power circuit breakers and the interconnection to current detectors (42, 44, 46) will be referred to in short as "short circuiter-disconnector combination" 300.

The switch-off times of the power circuit breakers 32', 32" should be in the range from 150 ms to 200 ms. If current feed aggregates (diesel generators 6) are to be present, the switch-off times of the incoming switches that protect the diesel generators should be in the range from 300 ms to 500 ms. The switch-off times of the outgoing switch 28 located upstream from the motor drives 8 should be in a range that is shorter than 100 ms. An aspect of the present invention is that the selectivity of the switch involved is defined in such a way that there are three time spans for the switch-off times and these do not overlap or their limits do not lie close to each other.

For purposes of explaining the invention, in FIG. 2, the switches 26, 27, 28, 32', 32" are closed and the low-voltage installation is energized. In this situation, a short circuit 80 should occur (in partial section 10'). This can be an arcing fault or another kind of short circuit. Current is fed into the supply line 10 by transformers, generators and by the motor drives, which also function as generators in case of a short circuit. The current intensities of 30 kA or 40 kA shown by the current arrows are typical short-circuit current values. In typical low-voltage installations, the effective values of the short-circuit currents in the supply line can add up to more than 100 kA, in critical cases even up to 200 kA.

The entire short-circuit situation is detected by the current sensors 42 since the fault current is above the preset threshold, for example, twice the rated current. The current sensors 42 transmit a detection signal 46' via a data line to an electronic central unit 44 which responds by emitting a triggering signal 46" to the high-speed short circuiter 40. Owing to the forced metallic (galvanic) short circuit of the short circuiter, the circuit breaker 32" in the current path 34 opens more quickly than all of the incoming switches 26.

Due to the fast interruption of the current surge stemming from the feed aggregates when the circuit breaker 32" is opened, the duration of the short-circuit current load in the partial line 10" is not long enough to cause the incoming switch 26" to respond.

The selectivity of the switches 32', 32", 26 has already been mentioned above. The switch-off time of the circuit breakers 32', 32" in the disconnection point is shorter than that of the incoming switches 26 located downstream. The incoming switch 26 opens with a lower priority and now disconnects only the partial line 10' affected by the short circuit from the feed aggregates 6.

The right-hand partial line 10" is no longer affected by the short circuit 80 (in the left-hand partial line) and the non-faulty partial line 10" continues to work. The short circuit does not cause a collapse of the entire operation in the supply line 10. A partial operation can be maintained wherever feed aggregates continue to run or wherever diesel generators are started up. This means that essential systems that are to be supplied with energy do not sustain any damage. Parts of such low-voltage installations can remain functioning until the fault is remedied.

After the high-speed interruption, a fault search preferably takes place in which it is ascertained where and why the fault occurred. Once the fault has been remedied and the actuated high-speed short circuiter has been replaced with a functioning high-speed short circuiter, the voltage in the supply system can be ramped up again.

Figure 3:
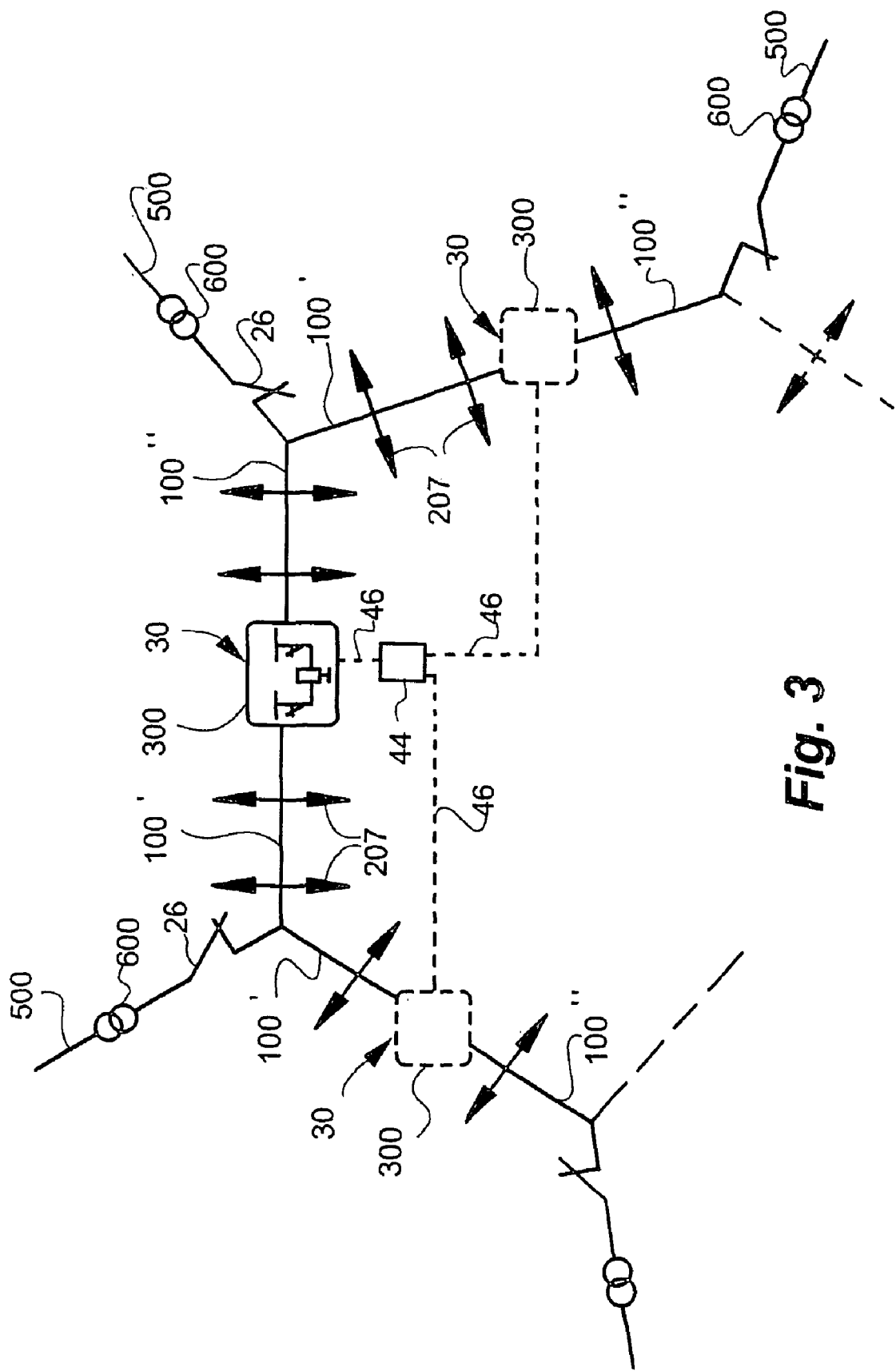
FIG. 3 shows a schematic depiction of an energy supply for consumer networks.

FIG. 3 shows an energy supply in the form of a ring (full ring or partial ring) for a consumer network, for example, for a residential neighborhood or for a large industrial consumer. The voltage level of the consumer 207 is low voltage; the feed takes place from the medium voltage level 500 via transformers 600 into the supply lines (100', 100"). The limiting device according to the invention is explained on the basis of this example in which a supply system with more than one disconnection point 30 is needed.

The transformers 600 can be disconnected from the ring system via feed power circuit breakers 26. Each supply line between two feed points is divided into two sections 100', 100". The disconnection points 30 are occupied by short circuiter-disconnector combinations 300 (including the current sensors 42): this was already discussed in FIG. 2. Like in linear systems (FIG. 2), each partial supply line 100', 100" is associated with a current detector 42. The message lines of the current detector 42 converge in a central unit (lines 46), from where the short circuiters 40 of the combinations 300 can be energized.

The detection of a short circuit and the functioning of the short circuiter-disconnector combinations 300 in a ring system according to FIG. 3 correspond to the sequences in a linear system as depicted in FIG. 2. The detection of the position of the short circuit is dispensed with, thanks to the speed of the detection and of the desired quick disconnection of the partial lines. All of the short circuiter-disconnector combinations 300 act at the same time, so that all of the disconnection points 30 open simultaneously. The use of a system to ascertain the location of the short circuit, for example, by determining the current direction of the short-circuit current, would be too complicated and probably also too slow. The advantage of using the present invention outweighs the effort that would be associated with reestablishing the activation of the high-speed short circuiter (for example, replacement of one-time short circuiters).

The present invention is not limited to the embodiments described herein; reference should be had to the appended claims.

LIST OF REFERENCE NUMERALS 6, 600 feed aggregate (generator, transformer)
7, 207 consumers
8 motor drive
10, 100 supply lines (cable, busbar)

10', 10"
100', 100" line sections
16, 17, 18 current paths
25 coupling switch
26 incoming switch
27 protective circuit breaker
28 motor protective circuit breaker
30 disconnection point
31 coupling bar
32', 32" power circuit breaker
34 current path or coupling bar
40 high-speed short circuiter
42 current sensor
44 central unit
46 detection signal on data line
46' triggering signal
80 short circuit
300 short circuiter-disconnector combination
500 medium voltage

The invention claimed is:

1. A device for limiting short-circuit current in a consumer network having at least one supply line with a respective current feed point and operated with alternating current and low voltage, wherein electric energy having a medium voltage level is supplied to the customer network via current feed aggregates, the device comprising:
   a disconnection point disposed in the at least one supply line so as to provide a first partial line and a second partial line in an event of a short-circuit fault, each of the first and second partial lines having a respective associated current detector and at least one of the first and second partial lines having at least one current feed aggregate;
   a multiphase high-speed short circuiter disposed in the disconnection point and having a current carrying capacity for short-circuit current intensities in the at least one supply line; and
   a respective power circuit breaker connected in series with the high-speed short circuiter toward each of the first and second partial lines, a switch-off time of the respective power circuit breaker being shorter than a switch-off time of an associated incoming switch,
   wherein the respective associated current detector is configured, upon detection of a short circuit in one of the first and second partial lines, to transmit a triggering signal to the high-speed short circuiter so as to effect a short-circuit switching operation in the disconnection point.

2. The limiting device as recited in claim 1, wherein the limiting device includes a plurality of high-speed short circuiters connected in parallel so as to provide a current carrying capacity for expected current intensities.

3. The limiting device as recited in claim 1, wherein the at least one supply line includes at least one of a cable and a conductor bar.

4. The limiting device as recited in claim 1, wherein the current feed aggregate includes a transformer.

5. The limiting device as recited in claim 1, wherein the at least one supply line forms a stand-alone system.

6. The limiting device as recited in claim 1, wherein the at least one supply line forms a ring system.

7. The limiting device as recited in claim 1, wherein at least one generator is disposed in the at least one supply line.

8. The limiting device as recited in claim 1, wherein the high-speed short circuiter is a one-time short circuiter.

9. The limiting device as recited in claim 8, wherein the high-speed short circuiter includes a pyrotechnically operated short circuiter.

10. The limiting device as recited in claim 1, wherein a detection threshold of at least one of the respective associated current detectors is adjustable.

11. The limiting device as recited in claim 10, wherein the detection threshold is set at two times a rated current.

12. The limiting device as recited in claim 10, wherein the detection threshold is set at four times a rated current.

13. The limiting device as recited in claim 11, wherein at least one of the respective associated current detectors includes a current transformer.

14. The limiting device as recited in claim 1, wherein at least one of the respective power circuit breakers is electronically actuatable and lockable so that it cannot be switched back on while the high-speed short circuiter is installed and in an activated condition.

15. The limiting device as recited in claim 1, wherein the high-speed short circuiter is configured to connect phases of the at least one supply line to each other during the short-circuit switching operation.

* * * * *